United States Patent

[11] 3,613,020

| [72] | Inventor | Kevin P. McBride |
| --- | --- | --- |
| | | Chili, N.Y. |
| [21] | Appl. No. | 771,202 |
| [22] | Filed | Oct. 28, 1968 |
| [45] | Patented | Oct. 12, 1971 |
| [73] | Assignee | Sybron Corporation |
| | | Rochester, N.Y. |

[54] PROCESS CONTROL SYSTEM
11 Claims, 2 Drawing Figs.

| [52] | U.S. Cl. | 330/1 A, 330/24, 330/51, 330/35, 330/3 |
| --- | --- | --- |
| [51] | Int. Cl. | H03f 1/00 |
| [50] | Field of Search | 330/51, 1 A; 307/251, 304 |

[56] References Cited
UNITED STATES PATENTS

| 3,392,345 | 7/1968 | Young | 330/51 |
| 3,474,259 | 10/1969 | Rodgers | 330/51 X |

*Primary Examiner*—Nathan Kaufman
*Attorneys*—Peter J. Young, Jr. and Joseph C. MacKenzie

ABSTRACT: A sampling control system having a sampling capacitor the charge on which determines the control effect of a process control element. A MOSFET switch periodically connects the capacitor to a source of control voltage. When the MOSFET switch disconnects the capacitor from the control voltage the capacitor transfers its charge to an integrating holding circuit including an amplifier. The amplifier is part of an analog controller which can be connected to the control element to determine its control effect. The control element controls a variable in a process. In sampling control, this variable and other factors determine the control voltage, and hence the control effect. The analog controller, however, causes the control effect to be a function of the deviation of the variable from a given value.

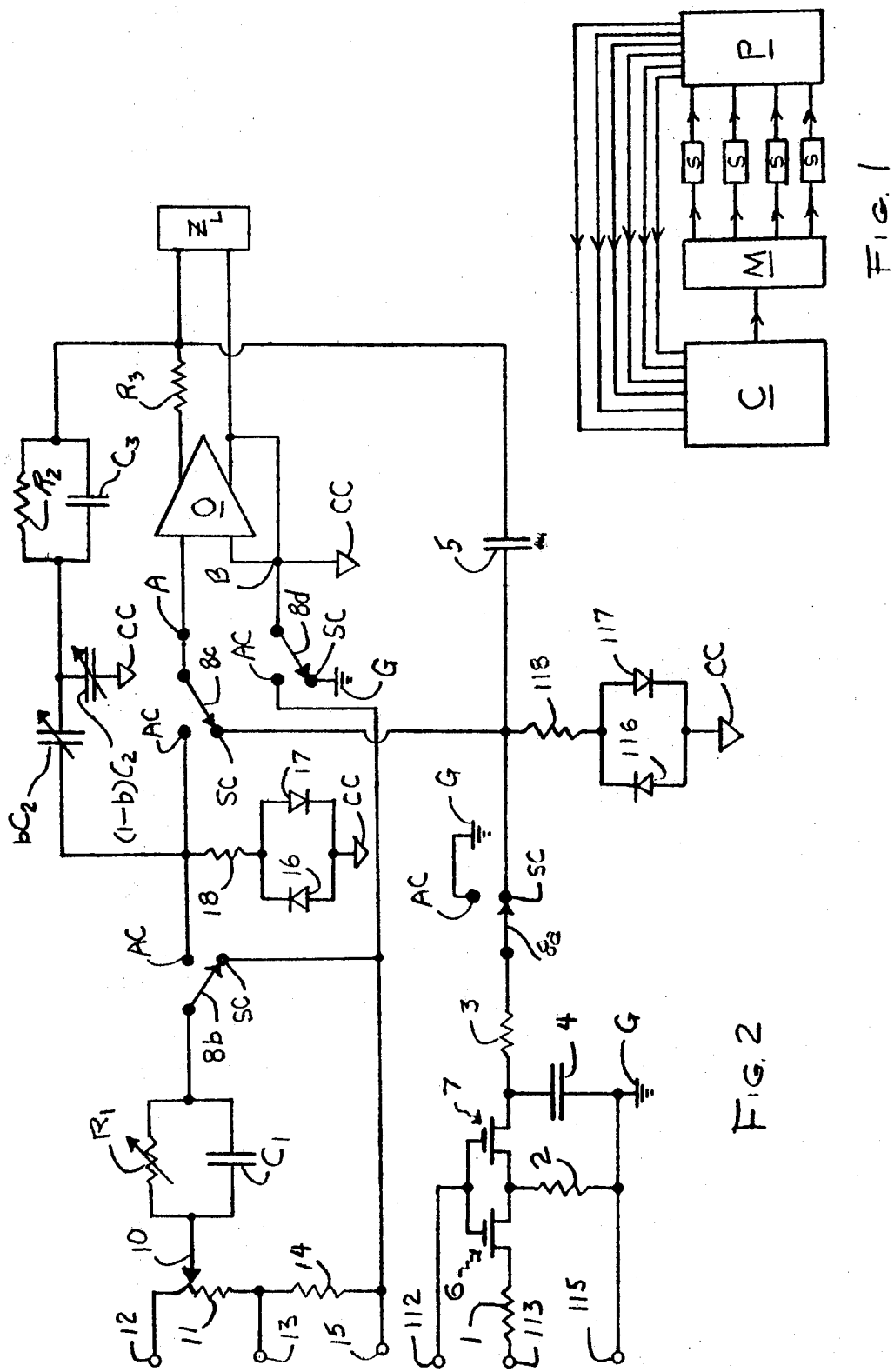

PROCESS CONTROL SYSTEM

This invention relates to sampling and continuous control of processes. In the latter, as stated by *Computer Handbook*, Huskey and Korn (eds.), McGraw-Hill Book Company, Inc., 1st Edition, 1962, Section 21, p. 84, "The control equipment for a chemical or petroleum process consists typically of a large number of more-or-less independent controllers, each of which performs some relatively simple function such as the regulation of a temperature, pressure, or flow. In some cases, the resulting variables are passed along to serve as reference levels for subsequent controllers. In other cases, the outputs of several controllers and measuring elements may be combined according to some mathematical relationship for further control or for indication and metering purposes. Coordination of the many separate control loops is provided principally by the human operators who continuously monitor the important process variables and adjust the regulating levels of the individual controllers in order to obtain the desired overall results." To this, it is to be added that "coordination," "adjustment of regulating levels," etc., also must frequently reflect costs, supply and demand, product composition, product quality, and so forth. Typical "more-or-less independent controllers" would be analog controllers, for example, of the type disclosed in N. B. Nichols U.S. Pat. No. 3,127,105, granted Mar. 31, 1964 and assigned to the assignee of the present invention.

It is also known to control processes on a sampling basis by means of a computer, commonly one which amounts to a general purpose digital computer of substantial information handling and computational power. Such computer automatically performs substantially all the tasks indicated in the foregoing paragraph. That is to say, one computer, in general, replaces the "human operators, " and the "more-or-less independent controllers." As a rule, however, the computer acts on the process, one part at a time, thereby putting control on a sampling basis.

The computer controls the process via control stations, one or more of these usually relaying the computer's commands to some part of the process at any given time. These stations each have one or more basic functions, one of which is "sample and hold," and another of which is "analog backup," the former providing for sampling control on a sampling basis, and the latter providing for continuous control such as described in the excerpt quoted from *Control Handbook*. The present invention relates to novel control stations having sample and hold and analog backup functions. According to the invention, a MOSFET (metal oxide semiconductor field effect transistor) switch connects the station to the computer during the sampling period, and disconnects it from the computer the rest of the time.

In the sampling period, a holding circuit receives control information from the computer and produces a corresponding control signal. This signal is applied to a control element, say a valve, to hold it at a position corresponding to the signal. Normally, valve position does not change unless, in the sampling period, the computer commands a change, i.e., the holding circuit maintains the valve position last commanded by the computer unless the computer orders a change. In the present invention, the holding circuit has a holding capacitor and amplifier arranged so that the amplifier's output is the control signal with a proportional feedback signal making capacitor voltage represent the integration of the computer's commands. The charge on this capacitor is transferred to it from the sampling capacitor which is charged by the computer during the sampling period.

Further, the control station includes an analog controller such as shown in FIG. 1 of the above-cited Nichols patent. This controller also uses an amplifier, hence, according to the invention, the holding circuit and analog controller of the control station use the same amplifier.

One advantage of such control station is that in the holding circuit configuration, the sampling time may be made much shorter than that acceptable to the response time of the amplifier. This configuration merely requires that the amplifier time response is sufficient for the time interval between consecutive inputs whereas the input time (sampling time) may be made as short as the source resistance and sampling capacitor permit.

Dual use of the amplifier makes for economy of parts, since the amplifier is by far the bulk of both the holding circuit and the analog control circuit, in terms of both parts and cost. Further, the dual use of the amplifier facilitates design of the system, simplifies maintenance and reduces spare-parts inventories. Thus, because computers are costly, the designer of a control system may attempt to identify what parts of the system must be controlled by the computer, specifying sample and hold stations for these, while specifying analog controllers alone, or the like, for the rest of the system. If analog control alone will not do in the cases where analog control alone is specified, then the system will have to be revised in some degree, as by replacing one or another analog controller with a sample and hold station. It is frequently the case that only actual experience with the system will establish to what extent it should be computer controlled.

The control station according to the present invention includes both sample and hold and analog control capability, with sufficient economy that the designer need merely specify it for all stations and leave it to experience to show which function of any given station should be used. Such practice also leads to economies in maintenance and spare-parts inventories since the number of control station types is reduced to one. In fact, the actual control system can be part of the spare-parts inventory. For example, if the sample and/or hold capability fails in a computer-controlled station, but its analog control capability remains operative, it can be used to replace any station which is exercizing the analog control capability, and also has its unused sample and/or hold capability operative. The latter station, in turn, can provide the necessary sample and hold capability which the first-mentioned station can no longer provide.

In the drawing,

FIG. 1 is a box diagram of a typical computer-controlled process system, and

FIG. 2 shows a specific form of control station for such system, according to the invention.

The system of FIG. 1 is, of course, old and is presented here merely by way of background. While, in general, the components of the system may take many forms, the present invention relates to the control station S, which, in the form shown is FIG. 2, can be used for all or some of the stations S of FIG. 1, and with the various forms the remainder of the system may take in practice.

In FIG. 1, box C represents a computer, box M is a multiplexer, boxes S are control stations, and box P is a process. As the longest connecting lines suggest, the computer receives information from the process. Generally, other types of information are also received by the computer, though this is not indicated on the FIG., likewise, the process and control stations also have input and output of material and energy of various sorts, also not indicated.

The multiplexer is simply any facility of the computer, or other means, that serves to selectively connect the computer to the control stations S, as needed and/or as determined by the computer.

The stations S receive the commands of the computer and operate various control elements (not shown) in the process environment, say, valves, as suggested before, by way of example, each of which responds to a signal from its control station to maintain a rate of flow of some material into or out of the process environment in proportion to said signal. The effect of such flow on one or another process condition is reflected, of course, in the information the process is providing to the computer. As this style of system operation is well-known in the prior art, it need not be considered in any further detail.

Turning to FIG. 2, in essence the analog control elements of the invention are as disclosed in the aforementioned Nichols patent. Thus, the reference characters 10 through 15, $R_1$, 2, $C_1$, $C_2$, $bC_2$, $(1-b)C_2$, A, B, 0 and $Z_L$ identify elements of the present figure that are the same as the like-numbered elements in Nichols' FIG. 1, and cooperate together as the three-term analog controller described by Nichols' equation(2). It will be noted that terminals 12, 13 and 15 of the Nichols' controller provide for receiving process-variable and set-point analog information. In the present case, these terminals would be connected to suitable sources of such information, independently of the computer C, of course, so that the analog controllers can perform their function when the computer is not on control.

The sample and hold elements of FIG. 2 consist essentially of resistors 1, 2 and 3, capacitors 4 and 5, and MOSFET 6 and 7.

Whether the circuitry shown in FIG. 2 is providing analog control, or sampling control, is determined by the condition of suitable switching means shown as comprising mechanical contactor switches 8*l*, 8*b*, 8*c* and 8*d*.

The contactor switches, each of which has a movable contactor, an AC (analog control) fixed contact and an SC (sampling control) fixed contact, are each shown with its movable contactor making its fixed SC contact. Tracing the circuitry in this state will show amplifier O to be in holding circuit configuration with capacitor 5. That is to say, the circuit is arranged to integrate the voltage across capacitor 4, the feedback voltage automatically increasing or decreasing, as needed, to keep amplifier output fixed at the value called for by the last computer command. Capacitor 5 is therefore chosen to be a good quality, low-leakage capacitor.

Starting with a steady-state condition where switches 6 and 7 are open and no current is flowing through resistor 3 (i.e., the voltage across capacitor 4 is the same as that across terminals A and B, namely, substantially zero volts, as is imposed by the feedback arrangement), then any change in the feedback voltage is due solely to amplifier offset current and/or leakage currents flowing to or from the capacitor 5. As the circuit elements will be chosen to minimize such influences, the feedback voltage can remain substantially constant for an indefinitely long time, say, for the interval between successive sampling periods.

At the next sampling period, however, a switching voltage is applied across terminals 112 and 115, and a voltage from the computer will appear across terminals 113 and 115. This last voltage will represent the change the computer desires to command in the signal to $Z_L$. Thus, using the example of a valve as control element, the computer will have to decide that the valve should increase the extent to which it is open, decrease it, or not change it, and provide a positive, negative or zero voltage, respectively across terminals 113 and 115, and corresponding in magnitude to the change, if any, desired in the valve opening.

Supposing a change in valve opening is ordered, i.e., the computer produces a nonzero voltage such that current flows through switches 6 and 7 into capacitor 4, then this last charges exponentially through resistance 1. (Resistance 1 normally will be merely the effective resistance of the source of voltage across terminals 113 and 115 combined with the on-resistance of the MOSFET switches 6 and 7.) The maximum voltage thus created on the capacitor is the voltage across terminals 113 and 115, times the ratio of the resistance of resistor 3 to the sum of the resistances of resistance 1 and resistance 3. Preferably, the resistor 3, which is the input resistor of the holding circuit, is large compared to the resistance in series with the voltage across terminals 113 and 115, namely, the effective source and switch-resistance represented as resistor 1. Also, the time, i.e., the sampling period, during which the computer voltage is applied should be at least five times the product of the capacitance of capacitor 4 and the resistance of resistor 1. Consequently, capacitor 4 will charge up to 99 percent of the voltage applied across terminals 113 and 115 (normally, a DC pulse of fixed amplitude during the sampling interval).

At the end of the sampling interval, the switching voltage will be removed from terminals 112 and 115 and the computer will go on to another sample and hold station, or set of such stations. Now the charge on capacitor 4 (a good quality, low-leakage capacitor) will decay exponentially through resistor 3 to terminal A, into feedback capacitor 5. The amplifier causes the feedback voltage and output signal to change correspondingly. The resistor 3 is chosen so that the time constant resulting from it and capacitor 4 will produce a signal current which is within the response capabilities of the amplifier. The voltage across the feedback capacitor 5 is incremented by the ratio of the capacitance of capacitor 4 to that of capacitor 5, times the voltage to which capacitor 4 was previously charged.

It will be seen from the above that the charging time for the capacitor 4 is determined by a time constant that is the product of the capacitance of capacitor 4 and the resistance represented by resistor 1. On the other hand, amplifier response is controlled by the time constant imposed by capacitor 4 and resistor 3, namely, the product of their respective capacitance and resistance. In general, for linear operation of the amplifier, this latter time constant must be relatively large, as compared to practical or convenient sampling period magnitude. The former time constant, however, is readily adjusted to be on the order of desirable sampling period magnitudes. Therefore, it will be evident that sample and holding circuitry of the invention reconciles short charging times and long settling times. With resistor 3 much larger than the effective resistance represented by resistor 1, the effect of variation in sampling period length on the signal across load $Z_L$ is significantly reduced.

The switches 6 and 7, i.e., the MOSFET's, are connected together drain to source, and this interconnection is connected to ground via a resistor 2. When the MOSFET's are off, resistor 2 is a current shunting resistor for leakage currents flowing between the transistors. Actually, resistor 2 is a very large resistance as compared to resistor 1, while at the same time several orders of magnitude smaller than the off-resistance of either of the MOSFET's, such as to shunt transistor leakage currents away from capacitor 4 and resistor 3 at a ratio of 1,000 to one, say, while still be so large that when the MOSFET switches are on, resistor 2 can shunt only a negligible amount of the charging current flowing to capacitor 4.

The voltage applied across terminals 113 and 115 are, of course, computer commands to the load $Z_L$, computed on the basis of sampling control principles. That is to say, the computer periodically considers, in effect, what the valve or other control element represented by $Z_L$ is doing to the process and what it should do to the process, until the next sampling period.

If, for any reason, the computer cannot do this, or should not, or need not, then the circuitry of FIG. 2 provides for analog control of the load $Z_L$, and if all the control stations of the process are the same as the one illustrated, it is always possible to control the entire process or any part of it, as envisaged in the quotation, supra, from Control Handbook.

To use the analog control facility, it is merely necessary to switch the movable contactors of switches 8*a*, 8*b*, 8*c* and 8*d* over to the fixed contacts AC, thereby also breaking the connections via fixed contacts SC. When this is done, it will be seen that the operative part of the circuitry is essentially a controller such as the controller of the Nichols patent, supra, so load $Z_L$ now becomes controlled as a function of the relationship between the set-point voltage at tap 10 of resistance 11, and a process-variable voltage across resistance 14, the process-variable voltage representing a measure of the effect of the control element represented by load $Z_L$, the set-point voltage representing a measure of what the effect should be, and so on, as explained in the Nichols patent.

Bumpless transfer between the two modes of operation will be accomplished if at the time of transfer the feedback and input capacitors of the mode being transferred to are properly charged. The diode pairs 16, 17 and 116, 117 are clamps. That is, they provide paths to circuit common (also called feedback common) for their respective feedback capacitors. The feedback capacitor of the not-selected mode will, by charging or discharging through its diode pair, track the feedback voltage plus or minus that voltage which appears across its diode pair. As steady-state conditions are approached, the voltage across the diodes decreases essentially to zero volts, and the feedback capacitors are properly charged. Effectively the feedback capacitor is now connected to circuit common. Since point A is essentially at zero volts with respect to circuit common, there is no transfer of charge when the capacitor is switched between circuit common and point A. Thus, bumpless transfer will be effected. When either of the diode pairs is connected across the amplifier input A, to B, there is essentially zero volts across the diode pair. Under this condition of zero volts, the diode impedance is great enough to not significantly degrade the amplifier input impedance. The function of resistors 18 and 118 are for amplifier stability considerations. Switch $8b$, in the SC configuration maintains the error voltage, process to set point, across the capacitor $C_1$ so that there is no bump when $8b$ is transferred to the AC position. Switch $8a$ in the AC configuration connects the capacitor 4 through resistor 3 to the system ground so that any signals from the computer (the computer need not know the operating mode of this station) to the capacitor 3 will be discharged. If the set points for the analog-control mode and the computer-control mode are identical, the transfer between modes will be accomplished bumplessly. If the set points are different, the transfer will still be bumpless with the process resetting at the reset rate, there will be no gain bump, to the set point value of the mode to which it is being switched.

In the analog-control condition of the system of FIG. 2, it will be noted that the reference for all the operative parts of the circuit is to circuit common CC, which is isolated from system ground G. Ground G is normally computer ground. When the circuitry is switched to sample and hold, circuit common then goes to system ground.

In a practical example of the circuitry, a sampling period of $2\times10^{13}$ seconds, plus or minus 20 percent, was found feasible, allowing an arbitrary maximum control element change of plus or minus 25 percent of its full-scale change, per sampling period. The amplifier O was a typical operational amplifier having high-input impedance, high gain before feedback, low-leakage current, etc., and was capable of driving a load $Z_L$ of up to 800 ohms with 4–20 ma. DC, the input voltage range at terminals 13 to 15 was about 0.25 to 1.25 volts DC. The voltage range across terminals 113 and 115 was about −5 to +5 volts.

Our invention is described herein in connection with a particular existing type of analog controller. However, numerous variations of the system of FIG. 2 will routinely occur to those skilled in the art, which will be within the scope of the present invention. For instance, the input and/or output circuitry of the analog controller may vary widely from that shown. Again, the controller shown is a so-called three-term controller, i.e., it has proportional, derivative and integral control, but need not be, insofar as practicing the invention is concerned. For example, removing $R_1$ would make it a two-term controller, i.e., one having proportional and derivative only, but operation of the system as described would not be affected.

The system may also have one or another ancillary features. For example, ordinarily there will be a facility for so-called manual control. For example, a manually adjusted source of voltage completely independent of the system as shown may be provided, as an alternate means of controlling the load $Z_L$, or such manually adjusted source can utilize part of the system. In any case, suitable switching means would be provided for connecting the load to the manually adjusted source.

Having described our invention as required by 35 USC 112, we claim:

1. In a process-control system, a process-variable control station having a hold circuit, said hold circuit including an amplifier connected therein for producing a control signal as a sampling control function of process-variable deviation from a set point; said control station also having an analog-control circuit for producing a control signal as an analog-control function of process-variable deviation from a set point, said analog circuit requiring said amplifier connected therein in order to produce said control signal; and said control station also including switching means for switching said amplifier between mutually exclusive first and second states, said first state having said amplifier connected in said hold circuit for producing the first said control signal, and said second state having said amplifier connected in said analog-control circuit for producing the second said control signal.

2. In the process-control system of claim 1, said process-variable control station having sampling means, said sampling means being essentially a MOSFET switch for connecting and disconnecting voltage of a sampled data source to and from said hold circuit; said hold circuit including a sampling capacitance for being charged by said voltage through said MOSFET switch and including a holding capacitance connectable to said sampling capacitance for receiving the charge of said sampling capacitance, said sampling capacitance being isolated from external voltage sources except through said MOSFET switch.

3. The control system of claim 2, wherein said switch is a gate comprising a pair of MOSFET's having their gates connected together for application of one side of a switching voltage thereto, another electrode of one of said pair being ohmically connected to another electrode of the other of said pair; a resistance having one end ohmically connected to both the last said two electrodes; means for applying the first-said voltage to be gated by said gate across a third electrode of one of said pair and the other end of said resistor; means for connecting said sampling capacitance to receive said first-said voltage across a third electrode of the other of said pair and said other end of said resistor; and means for applying the other side of said switching voltage to said other end of said resistor.

4. In the process-control system of claim 2, wherein said analog circuit includes input capacitance and feedback capacitance, and including an analog data voltage source, and said switching means includes first, second, third and fourth switches, each having a first condition and a second condition between which each is operable; said first condition of each said switch being as follows:

said first switch connecting said MOSFET switch and one side of said sampling capacitance to one side of said holding capacitance, via impedance;
said second switch connecting circuit common of said amplifier to ground;
said third switch connecting said one side of said holding capacitance to the input of said amplifier;
said fourth switch connecting said input capacitance across said analog data voltage source;
said second condition of each switch being as follows:
said first switch connecting said MOSFET switch to ground and said one side of said sampling capacitance to ground;
said second switch disconnecting said circuit common from ground and connecting said circuit common to one side of said analog data voltage source;
said third switch disconnecting said one side of said holding capacitance from said input, and connecting one side of said feedback capacitance to said amplifier's input;
said fourth switch disconnecting one side of said input capacitance from said one side of said analog data voltage source and connecting said one side of said input capacitance to said amplifier's input;
said first state being defined by each said switch being in its said first condition, and said second state being defined by each said switch being in its said second condition;
each said switch being of the type that is operable between its first and second conditions by breaking connection before making connection;
there being a first diode clamp connecting said one side of said feed back capacitance to said circuit common, and there being a second diode clamp connecting said one side of said holding capacitance to said circuit common, regardless of said switches' said conditions;

the other sides of said holding capacitance and said feedback capacitance being connected to said amplifier's output, the other side of said sampling capacitance being connected to ground, and the other side of said input capacitance being connected to the other side of said analog data voltage source, regardless of said switches' said conditions.

5. In the process-control system of claim 1, said process-variable control station having sampling means, said sampling means being essentially a switch for connecting voltage of a sampled data source to and from said hold circuit; said hold circuit including a sampling capacitor for being charged by said voltage, through said switch, and including a holding capacitance connectable to said sampling capacitance for receiving the charge of said sampling capacitance, said sampling capacitance being isolated from external voltage sources except through said switch.

6. The control system of claim 5, wherein said switch is a gate comprising a pair of MOSFET's having their gates connected together for application of one side of a switching voltage thereto, another electrode of one of said pair being ohmically connected to another electrode of the other of said pair; a resistance having one end ohmically connected to both the last two said electrodes; means for applying the first-said voltage across a third electrode of one of said pair and the other end of said resistor; means for connecting said sampling capacitance to receive said first-said voltage across a third electrode of the other of said pair and said other end of said resistor; and means for applying the other side of said switching voltage to said other end of said resistor.

7. In the process control system of claim 5, wherein said analog circuit includes input capacitance and feedback capacitance, and including an analog data voltage source, and said switching means includes first, second, third and fourth switches, each having a first condition and a second condition between which each is operable; said first condition of each said switch of said switching means being as follows:

said first switch connecting said sampling means and one side of said sampling capacitance to one side of said holding capacitance, via impedance;

said second switch connecting circuit common of said amplifier to ground;

said third switch connecting said one side of said holding capacitance to the input of said amplifier;

said fourth switch connecting said input capacitance across said analog data voltage source;

said second condition of each switch being as follows:

said first switch connecting said sampling means to ground and said one side of said sampling capacitance to ground;

said second switch disconnecting said circuit common from ground and connecting said circuiit common to one side of said analog data voltage source;

said third switch disconnecting said one side of said holding capacitance from said input, and connecting one side of said feedback capacitance to said amplifier's input;

said fourth switch disconnecting one side of said input capacitance from said one side of said analog data voltage source and connecting said one side of said input capacitance to said amplifier's input;

said first state being defined by each said switch of said switching means being in its said first condition, and said second state being defined by each said switch of said switching means being in its said second condition;

each said switch of said switching means being of the type that is operable between its first and second conditions by breaking connection before making connection;

there being a first diode clamp connecting said one side of said feedback capacitance to said circuit common, regardless of said switches' said conditions, and there being a second diode clamp connecting said one side of said holding capacitance to said circuit common, regardless of said switches' said conditions;

the other sides of said holding capacitance and said feedback capacitance being connected to said amplifier's output, the other side of said sampling capacitance being connected to ground, the other side of said input capacitance being connected to the other side of said analog data voltage source, and said analog data voltage source being isolated from ground, regardless of said switches' said conditions.

8. A gate comprising a pair of MOSFET's having their gates connected together for application of one side of a switching voltage thereto, another electrode of one of said pair being ohmically connected to another electrode of the other of said pair; a resistance having one end ohmically connected to both the last two said electrodes; means for applying a voltage to be gated by said gate across a third electrode of one of said pair and the other end of said resistor; means for connecting a load, to receive said voltage to be gated, across a third electrode of the other of said pair and said other end of said resistor; and means for applying the other side of said switching voltage to said other end of said resistor.

9. A hold circuit including the gate of claim 8, and having a sampling capacitor connected thereto as said load.

10. A sample and hold station including the hold circuit of claim 9, and having an amplifier having its input connected to said capacitor via impedance to receive the voltage of said capacitor; said amplifier having high-input impedance and high gain before feedback, and having a feedback circuit feeding said amplifier's output signal back to its input for maintaining the effective voltage at its input substantially at zero.

11. The sample and hold station of claim 10, wherein capacitance is connected to said feedback circuit for providing said output signal with a reset characteristic.